United States Patent
Collins (10) Patent No.: US 8,106,982 B2
(45) Date of Patent: Jan. 31, 2012

(54) LOGARITHMIC IMAGE SENSOR WITH IMPROVED DYNAMIC RANGE

(75) Inventor: Steve Collins, Oxford (GB)

(73) Assignee: Isis Innovation Limited, Oxford (GB)

( * ) Notice: Subject to any disclaimer, the term of this patent is extended or adjusted under 35 U.S.C. 154(b) by 549 days.

(21) Appl. No.: 12/092,052

(22) PCT Filed: Oct. 4, 2006

(86) PCT No.: PCT/GB2006/003683
§ 371 (c)(1),
(2), (4) Date: Aug. 12, 2008

(87) PCT Pub. No.: WO2007/051964
PCT Pub. Date: May 10, 2007

(65) Prior Publication Data
US 2009/0310003 A1 Dec. 17, 2009

(30) Foreign Application Priority Data
Nov. 1, 2005 (GB) .................................. 0522248.4

(51) Int. Cl.
H04N 5/335 (2011.01)
(52) U.S. Cl. ...................... 348/308; 348/297; 250/208.1
(58) Field of Classification Search .................. 348/308
See application file for complete search history.

(56) References Cited

U.S. PATENT DOCUMENTS

| 6,069,377 A | 5/2000 | Prentice et al. |
| 6,606,121 B1 * | 8/2003 | Bohm et al. ................. 348/297 |
| 2003/0001080 A1 | 1/2003 | Kummaraguntla et al. |
| 2003/0076432 A1 * | 4/2003 | Luo et al. ...................... 348/308 |
| 2005/0269488 A1 * | 12/2005 | King et al. ................ 250/214 R |

FOREIGN PATENT DOCUMENTS

| EP | 1107581 A2 | 6/2001 |
| WO | WO 02/45404 | 6/2002 |

* cited by examiner

Primary Examiner — Sinh Tran
Assistant Examiner — Paul Berardesca
(74) Attorney, Agent, or Firm — Knobbe Martens Olson & Bear LLP (57) ABSTRACT

An image sensor for an electronic imaging device includes an array of pixel detectors. Each pixel detector includes a photosensor (2) that is constructed and arranged to detect incident light and provide a signal that represents a time integral of the detected light intensity. A signal generator device (4) is constructed and arranged to generate a reference signal that varies according to a predetermined function. A comparator (6) has a first input (18) connected to receive the photosensor signal, a second input (20) connected to receive the reference signal, and an output (22) for providing a capture signal. The comparator (6) is constructed and arranged to generate a capture signal at a time determined by comparing the photosensor signal and the reference signal. A read out device (10) is constructed and arranged to capture a read out signal upon receiving the capture signal. The read out signal represents a logarithm of the integrated detected light intensity.

21 Claims, 5 Drawing Sheets

LOGARITHMIC IMAGE SENSOR WITH IMPROVED DYNAMIC RANGE

RELATED APPLICATIONS

This application is the U.S. National Phase filing under 35 U.S.C. §371 of PCT/GB2006/003683, filed Oct. 4, 2006, which designated the United States and was published in English, which claims priority under 35 U.S.C. §119(a)-(d) to Great Britain Patent Application No. 0522248.4, filed Nov. 1, 2005. The contents of these applications is incorporated herein by reference in their entireties.

FIELD OF THE INVENTION

The present invention relates to an image sensor for an electronic imaging device, and to a method of sensing. The invention also relates to an imaging device having such an image sensor.

BACKGROUND OF THE INVENTION

An image sensor for an electronic imaging device such as a camera generally consists of an array of photosensitive picture element detectors ("pixel detectors"). Light falling on the image sensor is detected by the pixel detectors, which generate output signals corresponding to the amount of light falling on each of those detectors. The output signals of the pixel detectors are digitised and stored in an electronic file that contains the image information. The image sensor may be incorporated into either a still camera for taking single images, or a video camera, or any other electronic imaging device.

Many electronic imaging devices use a CCD sensor, which measures the incident light by integrating the photocurrent of each of the pixel detectors over a predetermined period to obtain a measurement of the charge that has passed through the detector. The huge market for low cost electronic imaging sensors that can be incorporated in devices such as digital cameras, mobile telephones and personal computers has also spurred the development of single chip CMOS sensors, which have several advantages over the existing CCD sensors. However, the vast majority of CMOS sensors use the same sensing strategy as CCD sensors: they integrate the photocurrent.

Integrating the photocurrent within each pixel works well under relatively uniform illumination conditions, where the luminance of the image subject has a relatively low dynamic range. However, natural scenes can have a very large dynamic range: for example of six decades. This causes a problem for image sensors with conventional integrating pixels, which have a linear output of relatively low dynamic range.

It is possible to capture high dynamic range scenes with low dynamic range cameras by using multiple integration times and then creating a composite image. However, this is necessarily a slow process, which is unsuitable for many applications (for example, video capture).

An alternative method of extending the dynamic range of linear pixel detectors has been devised by Stoppa et al (David Stoppa, Andrea Simoni, Lorenzo Gonzo, Massimo Gottardi and Gian-Franco Dalla Betta: 'Novel CMOS Image Sensor with a 132-dB Dynamic Range' IEEE JSSC 37(12) 1846-1852 (2002)). To achieve an increase in dynamic range, a comparator is integrated into each pixel. The comparator compares the voltage within the pixel with a threshold voltage. If the pixel voltage reaches the threshold value, the comparator disconnects two capacitors in the pixel from two analogue input voltages that together represent the time at which this event occurs. At the end of the integration process, the pixel voltage and the two time voltages are sampled from each pixel. These three analogue voltages are then digitised to 8-bits each, creating a 24-bit signal that encodes the photocurrent within the pixel.

The large number of bits per pixel produced by the above system is typical of the results of trying to represent a high dynamic range signal in a linear format. In the case of a camera the problem is compounded by the fact that the aim should be to match the performance of the human visual system, which means that the camera should be sensitive to 1% changes in luminance.

It is recognised that using a logarithmic scale is often a good strategy for representing a high dynamic range signal. In the case of a camera there may also be other fundamental reasons why this is helpful:

(i) The physical process of scene formation means that the dynamic range of a scene is dominated by illumination variations whilst the information is contained in images of the reflectance of objects. Since these two quantities are multiplicative, generating a logarithmic representation is the first critical step in the majority of processes, such as homomorphic filtering and tone mapping, whose object is to reduce the impact of illumination variations so that objects can be recognized or scenes displayed on devices with low dynamic ranges.

(ii) The human visual system is sensitive to contrast changes of approximately 1% over a wide range of illuminations. A logarithmic format for the image captures this information in the fewest possible bits. For example using a logarithmic format a 1% change in four decades can be represented by a signal with a dynamic range of a thousand rather than a million in linear format. This dramatic reduction in dynamic range significantly simplifies the design of the camera's electronics and reduces the amount of data generated.

These advantages suggest that a useful approach to achieving imaging of high dynamic range scenes is to use an image sensor with a logarithmic response. This may be particularly useful in applications involving video-rate capture on single chip cameras.

It appears therefore that high dynamic range logarithmic image sensors should be ideally suited to use in camera systems that are required to image natural scenes. However, despite the potentially huge market for a high dynamic range camera, logarithmic cameras remain relatively obscure and undeveloped. The reason for this is that, like 'silicon retinas', existing logarithmic cameras use a MOSFET operating in subthreshold within each pixel detector to create an output voltage that is proportional to the logarithm of the photocurrent in each pixel detector. Although this circuit has the correct functionality, the mechanism has two major problems. The first problem is that there are large variations between the characteristics of individual MOSFETs operating in subthreshold. The resulting variability in pixel response, known as fixed pattern noise, can be equivalent to changing the photocurrent by an order of magnitude. Although techniques have been devised to improve the quality of output images by correcting for fixed pattern noise, the other major problem remains. This is that the output voltage typically changes by less than 60 mV when the photocurrent changes by an order of magnitude. The maximum output signal change is thus only 0.3V. This means that the output signals from the pixel detectors are susceptible to temporal noise.

Two techniques have been proposed to increase the dynamic range of the output voltage from a logarithmic pixel. The first of these is based upon use of a floating-gate device in the place of the load transistor (S. Collins, J. Ngole and G. F. Marshall "A High Gain Trimmable Logarithmic CMOS Pixel" Electronics Letters, 36, (21) 1806 (2000)). Although this approach increases the dynamic range of the output voltage it relies upon immature floating-gate device technology. In addition, the increase in voltage swing within the pixel emphasises the slow response time already observed in logarithmic pixels when the photocurrent suddenly decreases.

An alternative approach that claims to increase the output voltage swing of a logarithmic pixel has been proposed by Lai, Lai and King ("A Novel Logarithmic Response CMOS Image Sensor With High Output Voltage Swing and In-pixel Fixed-Pattern Noise Reduction" Liang-Wei Lai, Cheng-Hsiao Lai and Ya-Chin King IEEE Sensors Journal 4(1) 122-126 (2004)). This sensor uses a bipolar phototransistor rather than a photodiode in an otherwise conventional logarithmic pixel. Although this change increases the output voltage swing of the pixels, this increase occurs in a region in which the response is not logarithmic. A closer examination of the characteristics of the pixel detector shows that the response is not a simple logarithmic function of the illumination intensity. In fact, the bipolar transistor amplifies the photo current, and at high illumination intensities the load transistor is driven into moderate inversion, rather than the weak inversion that is required to obtain a logarithmic response.

In summary, there appears to be a distinct advantage to using a pixel with a logarithmic response to create an image sensor suitable for capturing high dynamic range scenes. However, all existing pixels with this type of response either suffer from fixed pattern noise, or rely on unproven technology, or provide only an approximately logarithmic response.

It is an object of the present invention to provide an image sensor that mitigates at least some of the aforesaid problems.

SUMMARY OF THE INVENTION

According to one aspect of the present invention there is provided an image sensor for an electronic imaging device, the image sensor including an array of pixel detectors, each pixel detector including a photosensor device constructed and arranged to detect incident light and having a photosensor output for a photosensor signal that represents a time integral of the detected light intensity, a signal generator device constructed and arranged to generate a reference signal that varies according to a predetermined function, a sensing device having a first input connected to receive the photosensor signal and a second input connected to receive the reference signal, the sensing device being constructed and arranged to compare the photosensor signal and the reference signal and determine a capture moment from the comparison, and an output device that is arranged to capture an output signal at the capture moment, wherein said output signal represent a logarithm of the integrated light intensity.

The image sensor is capable of providing a logarithmic output that represents a wide dynamic range of light intensity is sensitive to 1% changes of luminance over the entire range, without creating excessively large data files. The image sensor is also capable of fast capture rates and is suitable for video capture. It also avoids or mitigates many of the known problems of existing logarithmic sensors, as it provides a true logarithmic response, it does not suffer from excessive fixed pattern noise, and does not rely on the use of immature technology. The image sensor is robust and reliable and provides significantly improved performance over existing sensors.

Advantageously, the photosensor includes a capacitance and a photosensor element that is arranged to conduct a current depending on the detected light intensity, and said photosensor signal represents a voltage across the capacitance as it is charged or discharged by the photosensor current.

Advantageously, the image sensor includes a reset device that applies an initial voltage to said capacitance, wherein said capacitance is subsequently charged or discharged by said photosensor current.

Advantageously, the reference signal varies according to a non-linear function. Preferably, the rate of change of said reference signal decreases with time. Advantageously, the form of the reference signal $V_s$ is defined by the function $$t = \frac{C \Delta V_s}{I_{ref}} \exp(-\Delta V_s / S),$$

where t is the time since the integration process began (and t>0), C is capacitance, $I_{ref}$ is a reference current, $\Delta V_s$ is the change in the reference signal from its starting value to its value at time t, and S is a selectable constant.

Advantageously, the sensing device determines the capture moment by sensing when the difference between the photosensor signal and the reference signal reaches a predetermined value. For example, the predetermined value may be zero or it may correspond to the threshold voltage of a transistor switch.

Advantageously, the sensing device includes a switching device that connects the photosensor output to the output device and is operable to disconnect the photosensor output from the output device.

In one embodiment, the sensing device includes a comparator having a first input connected to receive the photosensor signal, a second input connected to receive the reference signal, and an output for a capture signal, and a switch element having a first input connected to receive the photosensor signal, a second input connected to receive the capture signal, and an output for the output signal, the comparator being constructed and arranged to generate a capture signal at the capture moment and the switch element being arranged to connect the photosensor signal to the switch output and operable to disconnect the photosensor signal from the switch outlet upon receiving a capture signal. Advantageously, the comparator is constructed and arranged to generate a capture signal when the difference between the reference signal and the photosensor signal is zero.

The switch element may be an n-channel MOSFET with a gate connected to the comparator output, a source connected to receive the photosensor signal and a drain connected to the switch output. Alternatively, by switching the comparator inputs, a p-channel MOSFET may be used.

In another embodiment, the image sensor includes means for generating an index signal, said output device being arranged to capture said index signal at the capture moment.

In another embodiment, the sensing device includes a switch element that is constructed and arranged to connect the photosensor signal to the output device, and is operable to disconnect the photosensor signal from the output device at the capture time.

The switch element may include a transistor switch with a gate connected to receive the reference signal, a source connected to receive the photosensor signal and a drain connected to the output device. The transistor switch is preferably a p-channel MOSFET in the case of a discharging pixel, or an n-channel MOSFET in the case of a charging pixel. The transistor switch is preferably constructed and arranged to disconnect the photosensor signal from the output device when the difference between the reference signal and the photosensor signal is less than a threshold value.

One advantage of this embodiment is that the number of transistors required per pixel is reduced. This reduces the cost of the device and allows a greater density of pixels to be provided.

According to another aspect of the invention there is provided a method of sensing images in an electronic imaging device having an image sensor that includes an array of pixel detectors, the method comprising detecting incident light with a photosensor in each pixel detector and providing a photosensor signal that represents a time integral of the detected light intensity, generating a reference signal that varies according to a predetermined function, comparing the photosensor signal and the reference signal, and determining a capture moment from the comparison, and capturing an output signal at the capture moment, wherein said output signal represents a logarithm of the integrated light intensity.

Advantageously, the capture moment is determined by sensing when the difference between the photosensor signal and the reference signal reaches a predetermined value.

Advantageously, the photosensor conducts a current that depends on the detected light intensity, and said photosensor signal represents a voltage across a capacitance that is charged or discharged by said photosensor current. Preferably, the photosensor conducts a current that is proportional to the detected light intensity.

The method may include applying an initial voltage to the capacitance, and subsequently discharging the capacitance by the photosensor current.

The reference signal may vary according to a non-linear function. The rate of change of said reference signal preferably decreases. The form of the reference signal $V_s$ is preferably defined by the function $$t = \frac{C\Delta V_s}{I_{ref}} \exp(-\Delta V_s / S),$$

where t is the time since the integration process began (and t>0), C is capacitance, $I_{ref}$ is a reference current, $\Delta V_s$ is the change in the reference signal from its starting value to its value at time t, and S is a selectable constant.

Advantageously, the method includes capturing the photosensor signal at the capture moment, said output signal being related to the captured photosensor signal. Preferably, the method includes disconnecting said output device from said photosensor signal at the capture moment. Advantageously, a capture signal is generated at the capture moment and the photosensor signal is captured upon receiving the capture signal.

Alternatively, the method may include generating an index signal and capturing said index signal upon receiving the capture signal, said output signal being related to the captured index signal. Advantageously, a capture signal is generated at the capture moment and the index signal is captured upon receiving the capture signal.

The most reliable method of increasing the noise immunity of any analogue signal is to increase its amplitude at the earliest opportunity. In the context of a pixel detector circuit this means designing a circuit with the largest possible output signal range. Furthermore, an ideal pixel circuit should be able to exploit double sampling techniques to reduce the effects of pixel variability and temporal noise in existing linear sensors. This suggests that unlike existing pixel circuits with a logarithmic response, the ideal logarithmic pixel circuit should integrate the photocurrent. Integrating the photocurrent in a pixel for a pre-determined integration time leads to a linear response. In the present invention, a logarithmic response is achieved by integrating the photocurrent for a variable time, as determined by comparing the photosensor signal with a reference signal that varies according to a pre-determined function.

BRIEF DESCRIPTION OF THE DRAWINGS

Certain embodiments of the invention will now be described, by way of example, with reference to the accompanying drawings, in which.

DETAILED DESCRIPTION OF THE PREFERRED EMBODIMENT

Figure 1:
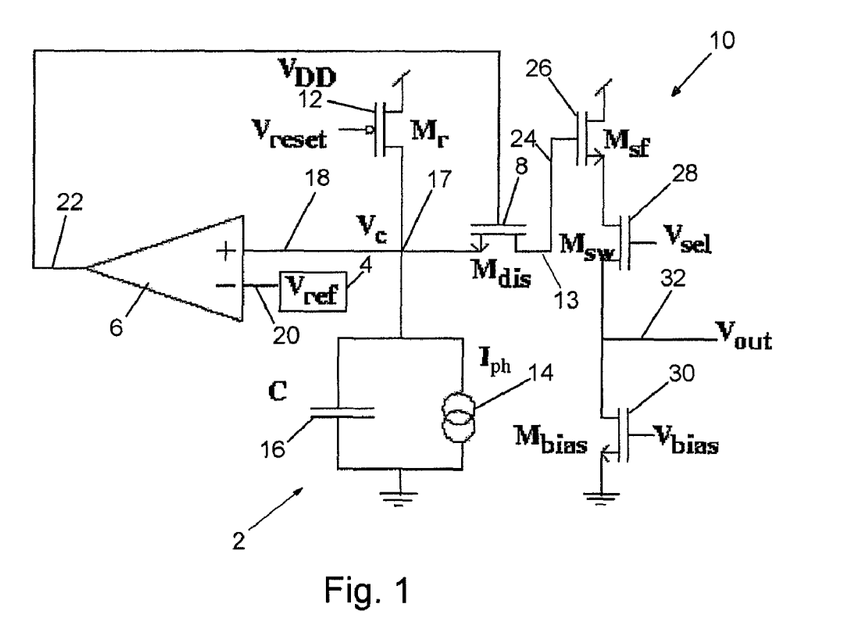
FIG. 1 is a schematic circuit diagram of a pixel detector that forms part of an electronic image sensor according to a first embodiment of the invention.

An image sensor for a camera conventionally includes an array of pixel detectors. FIG. 1 is a schematic circuit diagram of a pixel detector that forms part of such an array in an electronic image sensor according to a first embodiment of the invention.

The pixel detector includes a photosensor device 2, a signal generator 4, comparator 6, a transistor disconnect switch 8, an output device 10 in the form of a read out circuit and a transistor reset switch 12. The comparator 6 and the transistor disconnect switch 8 form a sensing device having an outlet 13 that is connected to the input of the output device 10. In this embodiment, the transistor disconnect switch 8 is an n-channel MOSFET.

The photosensor device 2 comprises a photodetector 14 connected in parallel with a capacitor 16. The required capacitance C can be provided by a separate capacitor as shown in the drawing and/or by the intrinsic capacitance of other circuit components. The photodetector 14, which is shown here as a constant current source, may for example be a photodiode or phototransistor. The photosensor device 2 provides a photosensor output signal at connection 17, represented by the capacitor voltage $V_C$. This output signal is connected to a first input 18 of the comparator 6. The signal generator 4 is connected to a second input 20 of the comparator. The reset switch 12 is also connected to the photosensor 2 through connection 17.

The comparator 6 has an output 22 for a capture signal, which is connected to the gate of the disconnect switch 8 to control operation of the switch. While the disconnect switch 8 conducts, it connects the output signal $V_C$ of the photosensor 2 via connection 17 to an input 24 of the output device 10. In this embodiment, the output device 10 comprises a conventional selectable source follower read out circuit, which includes a source follower transistor 26, a select transistor 28, a biasing transistor 30 and an output node 32. The output device 10 is designed to sense the voltage at the switch outlet 13 without drawing any current from the outlet. The select transistor 28 selects which pixel in a row or column of pixels is connected to the current source.

Figure 2:
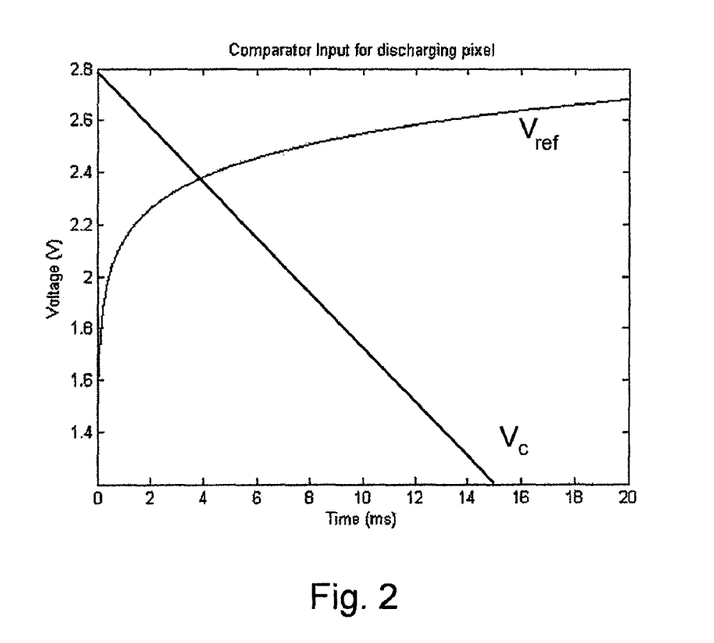
FIG. 2 is a graph showing the comparator reference voltage input for a discharging pixel detector of the type shown in FIG. 1.

In use, the image collection process is initiated by applying a low reset voltage $V_{reset}$ to the gate of the transistor reset switch 12, causing the switch to conduct. This applies a high voltage $V_{DD}$ to the photosensor 2 through the connection 17, thereby charging the capacitor 16. The reset voltage $V_{reset}$ then goes high and the reset switch 12 stops conducting, allowing the capacitor 16 to discharge through the photodetector 14. The rate at which the capacitor 16 discharges depends on the current $I_{ph}$ through the photodetector 14, which in turn depends on the intensity of light incident on the photodetector. The voltage $V_C$ at connection 17 thus decreases, as shown in FIG. 2. Assuming that the comparator input current is negligible, at a time t after the reset voltage has gone high, the voltage $V_C$ will be given by the equation:

$$V_C = V_{DD} - I_{ph} \cdot t/C$$

The photosensor 2 thus provides an output signal $V_C$ at connection 17 that represents a time integral of the detected light intensity (the constant of proportionality being negative). The output signal $V_C$ of the photosensor 2 is applied through the switch outlet 13 to the input 24 of the output device 10 via disconnect switch 8, and to the first input 18 of the comparator 6.

The signal generator 4, which is connected to the second input 20 of the comparator 6, is constructed and arranged to generate a time dependent reference signal $V_{ref}(t)$ that varies according to a predetermined non-linear function. One suitable form of the function, described in more detail below, is shown in FIG. 2. It can be seen that the reference signal $V_{ref}(t)$ increases with time t, and the rate of change of the reference signal decreases with time.

The comparator 6 thus receives the photosensor signal $V_C$ via the first input 18 and the reference signal $V_{ref}(t)$ via the second input 20, as shown in FIG. 2. The output 22 of the comparator is connected to the gate of the disconnect switch 8. The comparator 6 is arranged so that when the voltage $V_C$ is higher than the reference voltage $V_{ref}(t)$, the comparator output is high and disconnect switch 8 conducts, thus applying the photosensor signal $V_C$ to the output device 10. However, when $V_C$ is less than $V_{ref}(t)$ the comparator output is low and the disconnect switch 8 stops conducting, thus disconnecting the photosensor signal $V_C$ from the output device 10.

Figure 3:
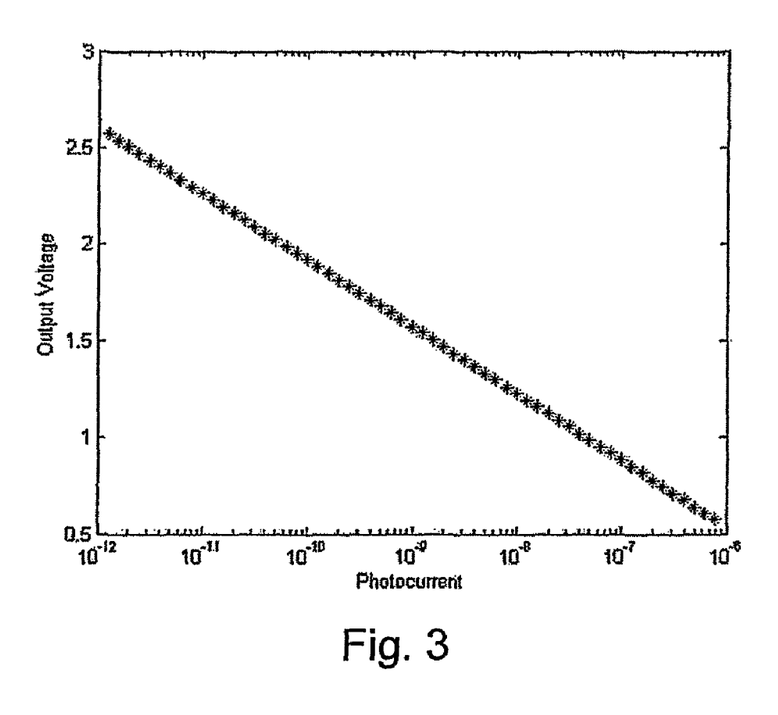
FIG. 3 is a graph showing the output response of a discharging pixel detector, illustrating the logarithmic response of the detector.

In use, the photosensor output signal $V_C$ starts high and falls, while the reference signal $V_{ref}(t)$ starts low and increases. The comparator 6 compares the two input signals and detects the transition point: i.e. when $V_C = V_{ref}(t)$. In the example shown in FIG. 2, this occurs after a time of about 4 ms. At this moment, which is referred to herein as the "capture moment", the output voltage of the comparator changes. The change in the voltage at output 22 provides a capture signal that controls the disconnect switch 8. When the capture signal is applied to the gate of the transistor disconnect switch 8, it stops conducting and hence isolates the gate of the source follower transistor 26 from the photosensor signal $V_C$. This disconnects the output device 10 from the photosensor signal $V_C$. The output device 10 thus captures the photosensor signal $V_C$ at the moment of disconnection and provides a read out signal at output node 32. The function that defines the form of the reference signal $V_{ref}(t)$ is designed such that the captured output signal $V_C$ is proportional to a logarithm of the photocurrent and thus of the integrated detected light intensity. This is depicted in FIG. 3.

The output signals from all of the pixel detectors in the image sensor array are fed to a conventional electronic processor (not shown), which digitises the signals and combines them to form an image file. This file may be viewed and/or stored for later viewing. The capture process can if required be repeated at suitable intervals to provide a video signal.

Different relationships between the photocurrent and the pixel output voltage can be obtained using different functions for the reference signal $V_{ref}(t)$. By using the reference signal shown in FIG. 2 as the comparator input voltage it is possible to create a pixel detector in which the voltage sampled onto the source-follower is proportional to the logarithm of the photocurrent. Alternatively, if a linear response is required instead of a logarithmic response, this can be achieved simply by changing the reference voltage supplied to the comparator from the form for a discharging pixel as shown in FIG. 2 to a constant low voltage value. It is therefore possible to switch easily between the two kinds of response.

The comparator reference voltage needed to provide a logarithmic response can be generated using a similar approach to that used in arbitrary waveform generators. For example, a read-only memory (ROM) and a digital analogue converter (DAC) can be used to create the reference voltage.

An image sensor based on the new pixel detector may have the following advantages:

(i) a higher output voltage range than that of conventional logarithmic image sensors, so that the output image is less vulnerable to both temporal noise and variations between pixels,
(ii) an integrating response, which means that unlike existing designs the pixel response time is not limited at low light levels,
(iii) a shot noise limited signal-to-noise ratio that is consistent with obtaining a 1% contrast sensitivity.

Figure 8:
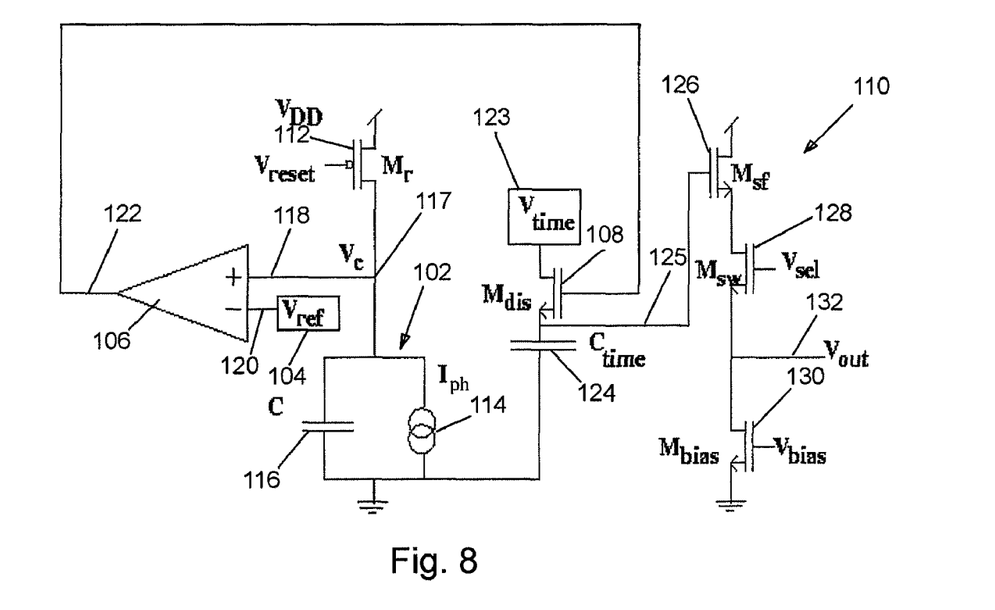
FIG. 8 is a schematic circuit diagram of a pixel detector that forms part of the electronic image sensor, according to a second embodiment of the invention.

FIG. 8 is a schematic circuit diagram of a pixel detector that forms part of an electronic image sensor according to a second embodiment of the invention. The pixel detector includes a photosensor 102, a first signal generator 104, a sensing device comprising a comparator 106 and a transistor disconnect switch 108, an output device 110 comprising a read out circuit, and a transistor reset switch 112.

The photosensor 112 comprises a photodetector 114 connected in parallel with a capacitor 116. The photodetector 114 may for example be a photodiode or phototransistor. The photosensor 102 provides a signal at connection 117, represented by the capacitor voltage $V_C$. This photodetector signal is connected to a first input 118 of the comparator 106. The signal generator 104 is connected to a second input 120 of the comparator. The reset switch 112 is also connected to the photosensor 102 through connection 117.

The comparator 106 has an output 122 for a capture signal, which is connected to the gate of the disconnect switch 108 to control operation of the switch. The disconnect switch 108 is arranged to connect the output of a second signal generator 123 to the input 125 of the output device 110. The output is also coupled to Earth through a capacitor 124. The output device 110 again comprises a conventional selectable source follower read out circuit, which includes a source follower transistor 126, a select transistor 128, a biasing transistor 130 and an output node 132.

The second signal generator 123 generates an index signal, for example in the form of a time-dependent ramp voltage $V_{time}$. While the disconnect switch 108 conducts, it connects the index signal to the input 125 of the output device 110.

The image collection process is initiated by applying a low reset voltage $V_{reset}$ to the gate of the transistor reset switch 112, causing the switch to conduct. This applies a high voltage $V_{DD}$ to the photosensor 102 through the connection 117, thereby charging the capacitor 116. The reset voltage $V_{reset}$ then goes high and the reset switch 112 stops conducting, allowing the capacitor 116 to discharge through the photodetector 114. The rate at which the capacitor 116 discharges depends on the current $I_{ph}$ through the photodetector 114, which in turn depends on the intensity of light incident on the photodetector. The voltage $V_C$ at connection 117 thus decreases, such that at a time t after the reset voltage has gone high, the voltage $V_C$ is given by the equation:

$$V_C = V_{DD} - I_{ph} \cdot t/C$$

The photosensor 102 thus provides a signal $V_C$ at connection 117 that represents a time integral of the detected light intensity. The photosensor signal $V_C$ is applied to the first input 118 of the comparator 106.

The first signal generator 104, which is connected to the second input 120 of the comparator 106, is constructed and arranged to generate a time dependent reference signal $V_{ref}(t)$ that varies according to a predetermined non-linear function, for example as shown in FIG. 2. The reference signal $V_{ref}(t)$ increases with time t, and the rate of change of the reference signal decreases with time. The reference signal is designed so that the time at which the integration stops is proportional to the logarithm of the photocurrent.

The comparator 106 thus receives the photosensor signal $V_C$ via the first input 118 and the reference signal $V_{ref}(t)$ via the second input 120. The output 122 of the comparator is connected to the gate of the disconnect switch 108. The comparator 106 is arranged so that when the voltage $V_C$ is higher than the reference voltage $V_{ref}(t)$, the comparator output is high and disconnect switch 108 conducts, thus applying the index signal $V_{time}$ to the output device 110. However, when $V_C$ is less than $V_{ref}(t)$ the comparator output is low and the disconnect switch 8 stops conducting, thus disconnecting the index signal $V_{time}$ from the output device 110.

In use, the photosensor signal $V_C$ starts high and falls, while the reference signal $V_{ref}(t)$ starts low and increases. The comparator 106 compares the two input signals and detects the transition of the two signals: i.e. when $V_C = V_{ref}(t)$. At the capture moment, the comparator output changes from high to low. This change in voltage at the output 122 serves as a capture signal and is applied to the gate of the transistor disconnect switch 108, which stops conducting and hence isolates the gate of the source follower transistor 124 from the index signal $V_{time}$ generated by the second signal generator 123. The output device 110 captures the index signal $V_{time}$ at the capture moment and provides an output signal at output node 132. Owing to the selected form of the reference signal $V_{ref}(t)$, the output signal is proportional to a logarithm of the photocurrent and thus of the integrated detected light intensity.

Figure 9:
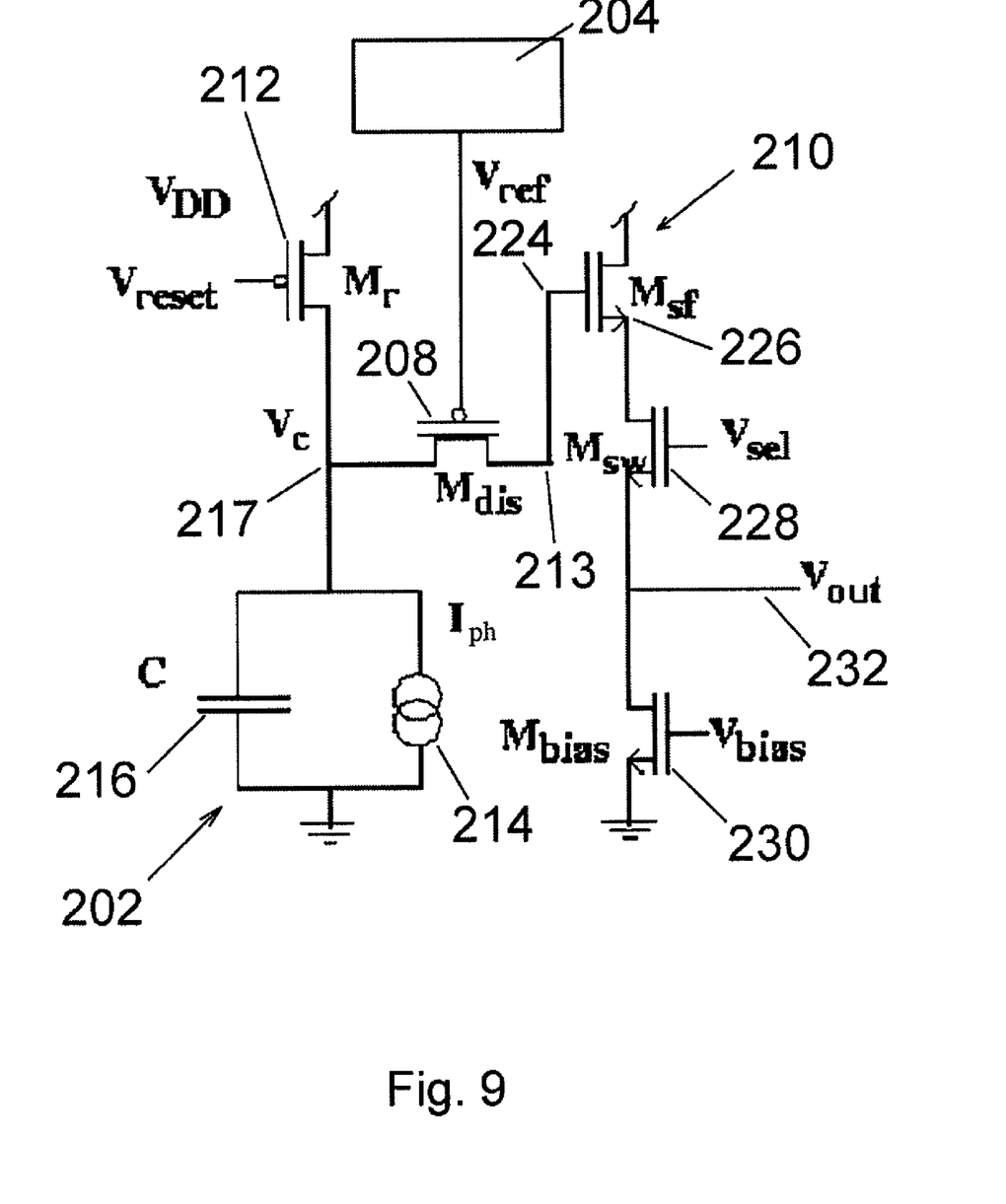
FIG. 9 is a schematic circuit diagram of a pixel detector that forms part of the electronic image sensor, according to a third embodiment of the invention

FIG. 9 is a schematic circuit diagram of a pixel detector according to a third embodiment of the invention. This embodiment uses fewer transistors per pixel than the first two embodiments and thus provides significant cost and size advantages over those embodiments. This is particularly important in image sensors with a large number of pixel elements.

The pixel detector includes a photosensor device 202, a signal generator 204, a sensing device 208 comprising a transistor switch, an output device 210 and a transistor reset switch 212. The transistor switch 208 has an outlet 213 that is connected to the input of the output device 210. In this embodiment, the transistor switch 208 is a p-channel MOSFET, which only conducts when the gate voltage is less than the source voltage by an amount equal to the transistor threshold voltage. When the gate voltage is equal to or greater than the source voltage minus the threshold voltage, the transistor 208 ceases to conduct.

The photosensor device 202 comprises a photodetector 214 connected in parallel with a capacitor 216. The required capacitance C can be provided by a separate capacitor as shown in the drawing and/or by the intrinsic capacitance of the photodetector 214 or other circuit components. The photodetector 214, which is shown here as a constant current source, may for example be a photodiode or phototransistor. The photosensor device 202 provides a photosensor output signal at connection 217, represented by the capacitor voltage $V_C$. This output signal is connected to the source of the transistor switch 208. The switch outlet 213 is provided by the voltage at the drain of the transistor switch 208. The reset switch 212 is connected to the photosensor 202 through connection 217.

The signal generator 204 is connected to the gate of the disconnect switch 208 and controls operation of the switch. When the reference voltage applied to the gate is less than the photosensor voltage applied to the source minus the threshold voltage, the switch conducts, so applying the photosensor output signal $V_C$ to the input 224 of the output device 210. When the reference voltage is greater than the photosensor voltage minus the threshold voltage, the switch ceases to conduct, thus isolating to the input 224 from the photosensor output signal.

The output device 210 comprises a conventional selectable source follower read out circuit, which includes a source follower transistor 226, a select transistor 228, a biasing transistor 230 and an output node 232. The output device 210 is designed to sense the voltage at the switch outlet 213 without drawing any current from the outlet. The select transistor 228 selects which pixel in a row or column of pixels is connected to the current source.

In use, the image collection process is initiated by applying a low reset voltage $V_{reset}$ to the gate of the transistor reset switch 212, causing the switch to conduct. This applies a high voltage $V_{DD}$ to the photosensor 202 through the connection 217, thereby charging the capacitor 216. The reset voltage $V_{reset}$ then goes high and the reset switch 212 stops conducting, allowing the capacitor 216 to discharge through the photodetector 214. The rate at which the capacitor 216 discharges depends on the current $I_{ph}$ through the photodetector 214, which in turn depends on the intensity of light incident on the photodetector. The voltage $V_C$ at connection 217 thus decreases.

At a time t after the reset voltage has gone high, the voltage $V_C$ will be given by the equation:

$$V_C = V_{DD} - I_{ph} \cdot t/C$$

The photosensor 202 thus provides an output signal $V_C$ at connection 217 that is proportional to a time integral of the detected light intensity (the constant of proportionality being negative). The output signal $V_C$ of the photosensor 202 is applied to the input 224 of the output device 210 via disconnect switch 208.

The signal generator 204 is constructed and arranged to generate a time dependent reference signal $V_{ref}(t)$ that varies according to a predetermined non-linear function. This may for example be similar to that shown in FIG. 2, but modified to take account of the threshold voltage. The reference signal $V_{ref}(t)$ increases with time t, and the rate of change of the reference signal decreases with time.

The transistor switch 208 receives the photosensor signal $V_C$ at the source terminal and the reference signal $V_{ref}(t)$ at the gate terminal. The drain terminal of the transistor switch 208 is connected to the switch outlet 213. When the reference voltage $V_{ref}$ is less than the photosensor voltage $V_C$ minus the threshold voltage $V_{th}$ (i.e. when $V_{ref} < V_C - V_{th}$) the transistor switch 208 conducts, applying the photosensor signal $V_C$ to the output device 210. However, when the reference voltage $V_{ref}$ is equal to or greater than the photosensor voltage $V_C$ minus the threshold voltage $V_{th}$ (i.e. when $V_{ref} > V_C - V_{th}$), the transistor switch 208 stops conducting, thus disconnecting the photosensor signal $V_C$ from the output device 210. In other words, the output device is isolated from the photosensor when the difference between the photosensor voltage $V_C$ and the reference voltage $V_{ref}$ is less than the threshold voltage $V_{th}$ (i.e. when $V_C - V_{ref} < V_{th}$). It should be noted that with p-channel MOSFETs, the threshold voltage is sometimes given as a negative number.

The output device 210 thus samples the photosensor signal $V_C$ at the capture moment and provides a read out signal at output node 232. The function that defines the form of the reference signal $V_{ref}(t)$ is designed such that the captured output signal $V_C$ is proportional to a logarithm of the integrated detected light intensity.

The image sensor is suitable for use in various applications, including in particular cameras (for still and video images) designed for use in uncontrolled lighting conditions, or conditions with a very wide dynamic range of luminance. These may include for example traffic monitoring cameras, security cameras, number plate identification cameras and night-vision cameras for use in cars. The image sensor may also be useful for various robotic applications, for example for machine vision.

A method of devising a function to create a suitable reference signal will now be described with reference to FIGS. 4 to 7. The first derivation relates to a sensor in which the time at which integration stops gives a logarithmic response (as shown in FIG. 8 of the drawings).

We assume that photocurrent is integrated onto a capacitance for a time t. The magnitude of the change in voltage that this will cause is $$|\Delta V| = \frac{I_{ph} t}{C}$$

The aim is to stop the integration process at a time $t_s$ that is proportional to the logarithm of the photocurrent $I_{ph}$. This means we want $$t_s = S Ln \frac{I_{ph}}{I_{ref}}$$

which is equivalent to $$I_{ph} = I_{ref} \exp(t_s/S)$$

At this time the change in voltage $$|\Delta V|_s = \frac{I_{ph} t_s}{C} = \frac{I_{ph} S}{C} Ln \frac{I_{ph}}{I_{ref}}$$

This means that the relationship between the photocurrent and the change in voltage when integration is stopped or a signal representing time is sampled is:

$$|\Delta V|_s = \frac{S I_{ph}}{C} Ln \frac{I_{ph}}{I_{ref}}$$

Removing the photocurrent leads to $$|\Delta V| = \frac{I_{ref} t}{C} \exp(t/S)$$

Now the capacitance is typically 1 pF and the times of interest are between 0 and 20 ms. In this time the change in voltage must be approximately 1V. This means that $I_{ref}$ will be larger than the typical photocurrent. This means that to obtain a positive time from the expression $$t_s = S Ln \frac{I_{ph}}{I_{ref}}$$

the parameter S must be negative. It is therefore better to re-write the expression for voltage in the form $$|\Delta V| = \frac{I_{ref} t}{C} \exp(-t/|S|)$$

to make it clear that the change in voltage eventually starts to decrease with time.

A quick inspection at t=0 and t=infinity shows that the function is zero at both these points. The function also has a maximum value when t=|S| and this value is $$|\Delta V| = \frac{I_{ref} |S|}{C} \exp(-1)$$

The reference voltage should be adapted to avoid the possibility that the comparator stops the integration process very quickly. One approach to doing this would be to hold the reference voltage so that it is equivalent to this maximum change until t=|S| and only after that time allow it to change. The change then becomes $$|\Delta V| = \frac{I_{ref} |S|}{C} \exp(-1) \text{ when } t < |S|$$

$$|\Delta V| = \frac{I_{ref} t}{C} \exp(-t/|S|) \text{ otherwise.}$$

The only problem with this pixel is that it needs a signal that represents time. There are therefore two externally supplied time dependant signals. The need for the signal to represent time can be avoided by stopping the integration process so that the voltage within the pixel itself represents the logarithm of the photocurrent.

For a sensor in which the pixel voltage gives a logarithmic response (as shown in FIG. 1), the function to create a suitable reference signal is derived as follows:

We assume that photocurrent $I_p$ is integrated onto a capacitance C. This means that the magnitude of the voltage change in a time t is given by $$|\Delta V| = \frac{I_p t}{C}$$

The aim is to stop the integration process at a time $t_s$ so that the magnitude of the change in voltage on the capacitance is proportional to the logarithm of the photocurrent. This means we want to stop integration or sample the voltage when it has changed by an amount $$|\Delta V|_s = S Ln \frac{I_p}{I_{ref}}$$

which is equivalent to $$I_p = I_{ref} \exp(|\Delta V|_s / S)$$

Equating the two expressions for the magnitude of the voltage change gives $$|\Delta V|_s = \frac{I_p t_s}{C} = S Ln \frac{I_p}{I_{ref}} \quad (A1)$$

This can be re-arranged to give $$t_s = \frac{SC}{I_p} Ln \frac{I_p}{I_{ref}}$$

From this equation it is easier to determine the time from the magnitude of the voltage change $$t = \frac{C|\Delta V|}{I_{ref}} \exp(-|\Delta V|/S)$$

Thus although it would be desirable to obtain an expression for the voltage change as a function of time it is easier to determine the time at which a particular change in voltage should lead to the termination of the integration of charge onto the capacitor.

In both cases for a pixel that charges a capacitor starting for a value $V_{init}$ $$V_{ref}(t) = V_{init} + |\Delta V|(t)$$

whilst if the capacitor is discharged by the photocurrent for a value $V_{init}$ $$V_{ref}(t) = V_{init} - |\Delta V|(t)$$

The proposed technique has been modeled assuming that the photocurrent is integrated onto a capacitor and that a comparator is used in each pixel to terminate charge integration if the condition in equation (A1) occurs. Typical results obtained using the values C=20 fF, $I_{ref}$=10 fA and S=0.15 are shown in FIGS. 4-7.

Figure 4:
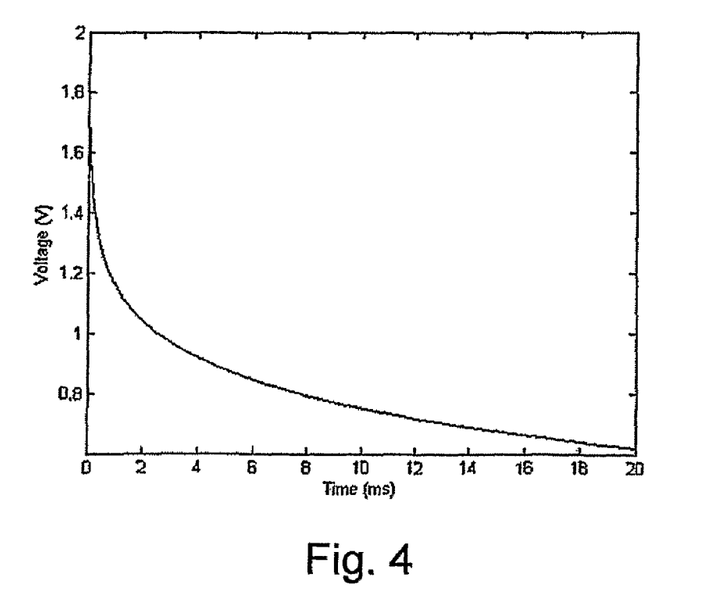
FIG. 4 is a graph showing the comparator reference voltage needed to create a logarithmic response in a charging pixel detector.
Figure 5:
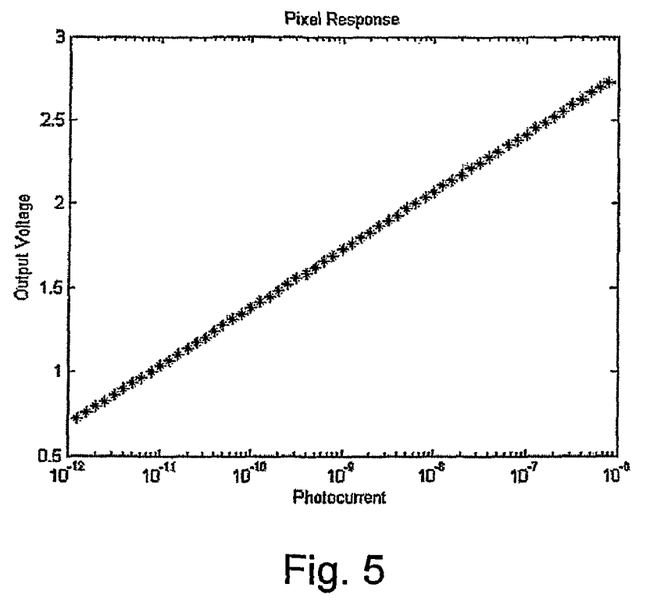
FIG. 5 is a graph showing the output voltage of a charging pixel detector as a function of the photocurrent, showing a logarithmic relationship between the photocurrent and the output voltage.

The reference voltage $V_{ref}(t)$ required in a charging pixel detector to generate a pixel output voltage that is proportional to the logarithm of the photocurrent is shown in FIG. 4. The results in FIG. 5 show that for these parameter values the output voltage when integration stops is proportional to the logarithm of the photocurrent over a luminance range of more than six decades, and that the output voltage changes by more than 300 mV per decade change in the photocurrent.

Figure 6:
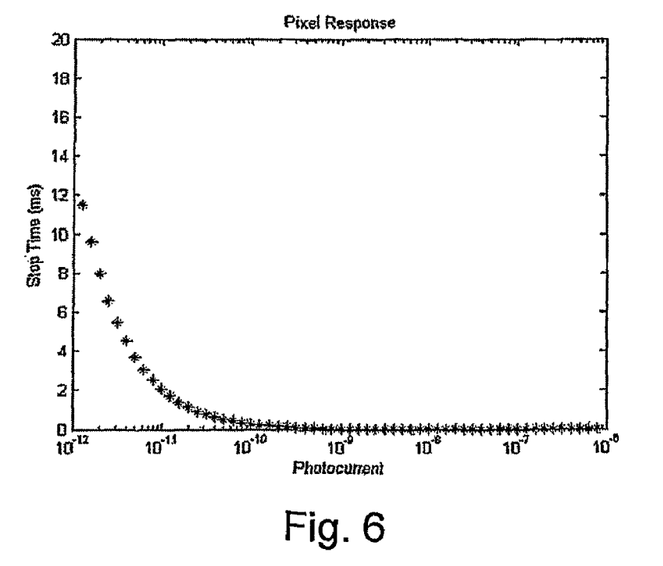
FIG. 6 is a graph showing the time at which integration stops as a function of the photocurrent.
Figure 7:
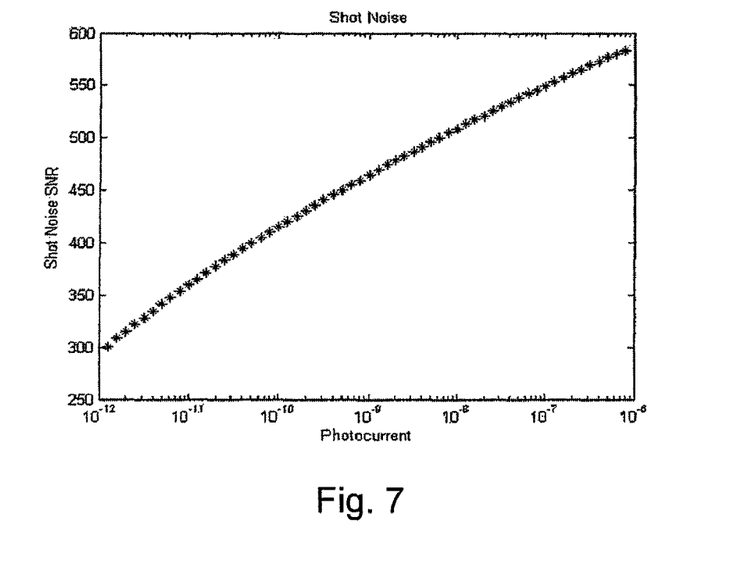
FIG. 7 is a graph showing the shot noise signal-to-noise ratio of the pixel detector.

Equally importantly, FIG. 6 shows that for these parameters the output voltage is generated within less than 20 ms for photocurrents as small as 1 pA. FIG. 7 shows that even for this small photocurrent, sufficient charge is integrated onto the capacitor that the shot noise limited signal-to-noise ratio is more than 300, which is consistent with the desired aim of achieving a contrast sensitivity better than 1%.

One critical advantage of this approach over the conventional method of creating a logarithmic pixel is that the change in output voltage per decade change in photocurrent is more than 300 mV per decade, compared to less than 60 mV per decade in a conventional design. This change in output voltage per decade is controlled by the parameter S. This means that it is controlled by the circuit designer rather than device parameters.

What is claimed is:

1. An image sensor for an electronic imaging device, the image sensor including an array of pixel detectors, each pixel detector including:
    a. a photosensor device which detects incident light and has a photosensor output for a photosensor signal that represents a time integral of a detected light intensity;
    b. a signal generator device which generates a reference signal $V_s$ that varies according to a predetermined non-linear function;
    c. a transistor switch having a first input connected to receive the photosensor signal, a second input comprising a gate connected to receive the reference signal, and an outlet for an output signal, wherein the transistor switch compares the photosensor signal and the reference signal and determines a capture moment from the comparison; and
    d. an output device that is connected to the outlet of the transistor switch and arranged to capture an output signal at the capture moment, wherein said output signal represents a logarithm of the integrated light intensity.

2. The image sensor according to claim 1, wherein the photosensor includes a capacitance and a photosensor element that conducts a current depending on the detected light intensity, and wherein said photosensor signal represents a voltage across the capacitance as it is charged or discharged by the photosensor current.

3. The image sensor according to claim 2, further including a reset device that applies an initial voltage to said capacitance, wherein said capacitance is subsequently discharged by said photosensor current.

4. The image sensor according to claim 1, wherein the rate of change of the reference signal decreases with time.

5. The image sensor according to claim 1. wherein the form of the reference signal $V_s$ is defined by the function $$t = \frac{C \Delta V_s}{I_{ref}} \exp(-\Delta V_s / S),$$

wherein t is time, C is capacitance, $I_{ref}$ is a reference current and S is a selectable constant.

6. The image sensor according to claim 1, wherein the transistor switch determines the capture moment by sensing when a difference between the photosensor signal and the reference signal reaches a predetermined value.

7. The image sensor according to claim 1, wherein the transistor switch sensing device includes a switch element that connects the photosensor signal to the output device, and disconnects the photosensor signal from the output device at the capture moment.

8. The image sensor according to claim 1, wherein the transistor switch includes a source connected to receive the photosensor signal and a drain connected to the output device.

9. The image sensor according to claim 8, wherein the transistor switch is a p-channel MOSFET.

10. The image sensor according to claim 9, wherein the transistor switch disconnects the photosensor signal from the output device when a difference between the reference signal and the photosensor signal is less than a threshold value.

11. A method of sensing images in an electronic imaging device having an image sensor that includes an array of pixel detectors, the method comprising:
   a. detecting incident light with a photosensor in each pixel detector and providing a photosensor signal that represents a time integral of a detected light intensity;
   b. generating a reference signal $V_s$ that varies according to a predetermined non-linear function;
   c. connecting the photosensor signal to a first input of a transistor switch, connecting the reference signal to a second input comprising a gate of the transistor switch, comparing the photosensor signal and the reference signal, determining a capture moment from the comparison, and generating an output signal at an outlet of the transistor switch; and
   d. capturing the output signal at the capture moment, wherein said output signal represents a logarithm of the integrated light intensity.

12. The method according to claim 11, wherein the capture moment is determined by sensing when a difference between the photosensor signal and the reference signal reaches a predetermined value.

13. The method according to claim 11, wherein the photosensor conducts a current that depends on the detected light intensity, and wherein said photosensor signal represents a voltage across a capacitance that is charged or discharged by said photosensor current.

14. The method according to claim 13, further including applying an initial voltage to said capacitance, and subsequently discharging said capacitance by said photosensor current.

15. The method according to claim 11, wherein the rate of change of said reference signal decreases.

16. The method according to claim 11, wherein the form of the reference signal $V_s$ is defined by the function $$t = \frac{C \Delta V_s}{I_{ref}} \exp(-\Delta V_s / S),$$

wherein t is time, C is capacitance, $I_{ref}$ is a reference current and S is a selectable constant.

17. The method according to claim 11, further including capturing the photosensor signal at the capture moment, wherein said output signal is related to the captured photosensor signal.

18. The method according to claim 17, further including disconnecting said output device from said photosensor signal at the capture moment.

19. The method according to claim 17, further including generating a capture signal at the capture moment and capturing the photosensor signal upon receiving the capture signal.

20. An image sensor for an electronic imaging device, the image sensor including an array of pixel detectors, each pixel detector including:
   a. a photosensor device which detects incident light and has a photosensor output for a photosensor signal that represents a time integral of a detected light intensity;
   b. a signal generator device which generates a reference signal Vs that varies according to a predetermined function;
   c. a sensing device having a first input connected to receive the photosensor signal and a second input connected to receive the reference signal, wherein the sensing device compares the photosensor signal and the reference signal and determines a capture moment from the comparison; and
   d. an output device that is arranged to capture an output signal at the capture moment, wherein said output signal represents a logarithm of the integrated light intensity, wherein the form of the reference signal $V_s$ is defined by the function $$t = \frac{C \Delta V_s}{I_{ref}} \exp(-\Delta V_s / S),$$

wherein t is time, C is capacitance, $I_{ref}$ is a reference current and S is a selectable constant.

21. A method of sensing images in an electronic imaging device having an image sensor that includes an array of pixel detectors, the method comprising:
   a. detecting incident light with a photosensor in each pixel detector and providing a photosensor signal that represents a time integral of the detected light intensity;
   b. generating a reference signal Vs that varies according to a predetermined function;
   c. comparing the photosensor signal and the reference signal, and determining a capture moment from the comparison; and
   d. capturing an output signal at the capture moment, wherein said output signal represents a logarithm of the integrated light intensity, wherein the reference signal varies according to a non-linear function, and the form of the reference signal Vs is defined by the function $$t = \frac{C \Delta V_s}{I_{ref}} \exp(-\Delta V_s / S),$$

wherein t is time, C is capacitance, $I_{ref}$ is a reference current and S is a selectable constant.

* * * * *

UNITED STATES PATENT AND TRADEMARK OFFICE
CERTIFICATE OF CORRECTION

PATENT NO. : 8,106,982 B2
APPLICATION NO. : 12/092052
DATED : January 31, 2012
INVENTOR(S) : Steve Collins It is certified that error appears in the above-identified patent and that said Letters Patent is hereby corrected as shown below:

At column 11, line 20, please change "$V_{ref} > V_C - V_{th}$" to --$V_{ref} \geq V_C - V_{th}$.--.

At column 14, line 61, claim 5, please change "1." to --1,--.

Signed and Sealed this
Sixteenth Day of October, 2012

David J. Kappos
*Director of the United States Patent and Trademark Office*